Aug. 25, 1925.
C. A. GOODSPEED
1,550,900
REENFORCEMENT FOR EYE OF WIRE OR THE LIKE
Filed April 1, 1924
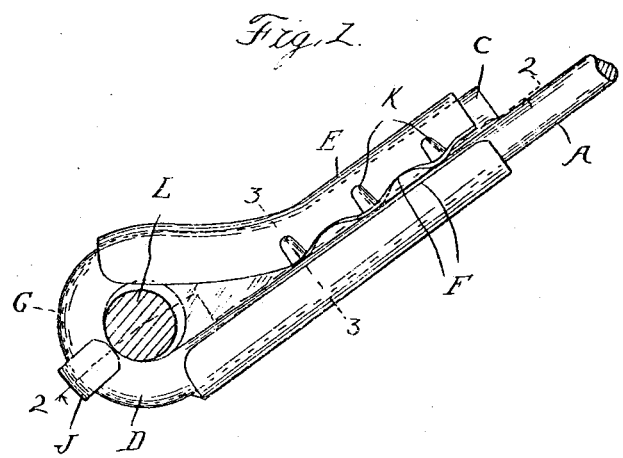
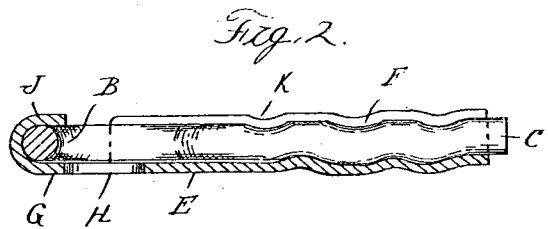
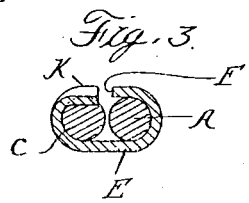
Inventor
Charles A. Goodspeed
By Whitmore Hulbert Whittemore & Belknap
Attorneys Patented Aug. 25, 1925.

1,550,900

UNITED STATES PATENT OFFICE.

CHARLES A. GOODSPEED, OF DETROIT, MICHIGAN, ASSIGNOR TO WILLIAM W. BLAKELY, OF DETROIT, MICHIGAN.

REENFORCEMENT FOR EYE OF WIRE OR THE LIKE.

Application filed April 1, 1924. Serial No. 703,485.

*To all whom it may concern:*

Be it known that I, CHARLES A. GOODSPEED, a citizen of the United States of America, residing at Detroit, in the county of Wayne and State of Michigan, have invented certain new and useful Improvements in Reenforcements for Eye of Wire or the like, of which the following is a specification, reference being had therein to the accompanying drawings.

This invention relates to wires, rods, or cables having terminal eyes to engage an anchorage or other member and particularly relates to reenforcing means for such eyes.

It is the object of the invention to provide a member formed preferably from sheet metal that may be employed to hold the eye of a wire or the like against pulling out, taking the place of the usual reenforcement formed by knotting, splicing, welding, or forging and insuring for the eye a tensile strength as great as that of the wire itself.

In the drawings:—

Figure 1 is a side view of a rod or wire having an eye reenforced in accordance with the invention;

Figure 2 is a longitudinal sectional view of the same upon line 2—2 of Figure 1;

Figure 3 is a transverse section taken upon line 3—3 of Figure 1.

In these views the reference character A designates a rod or wire having an end portion thereof return-bent, forming an eye B and extending for some distance beyond said eye in proximity to the body of the member A as indicated at C. E is a sleeve which may be formed to best advantage of sheet metal and which embraces the return-bent end portion C, together with the adjacent length of the main body A which also embraces a portion of the eye B. Said reenforcement preferably has edges F longitudinally adjoining substantially in the plane in which the member C lies adjacent the body A. That side of the reenforcement remote from the edges F is substantially coextensive with the eye B as is indicated at G and is formed with an opening H in registration with the opening of the eye B. J is a tongue integrally projecting endwise from the portion G of the reenforcement and forming a hook engaging the end of the eyelet to prevent the sleeve E from moving longitudinally of the body A. The end portion C of the member A is crimped transversely of the common axial plane of the portion C and member A and the reenforcement E is crimped into the undulations of the member C as indicated at K.

An eyelet in the end of the wire or the like, if not reenforced presents the possibility of yielding under tensile stress either by a bodily swinging of the return-bent portion about the axis of the eyelet or by a continued drawing of the wire around the member engaging in the eyelet such as is indicated at L in Figure 1. The described reenforcement forms a positive safe-guard against yielding due to either of these possibilities. Owing to the considerable length C of the return-bent portion which is embraced together with the body A by the reenforcement said portion C is very strongly held against the body A. Crimping of the reenforcement E into corresponding crimps in the end portion C very positively prevents any such lengthwise travel of the portion C relative to said reenforcement as must occur in drawing of the return-bend around the anchorage L. The hook J resists any force tending to shift the reenforcement along the body A away from the eyelet B. The eyeleted portion G of the reenforcement is engageable by the anchorage member L to subject said reenforcement to a portion of the stress transmitted from said anchorage member, this endwise stress on said reenforcement acting through the curved shoulder M thereof to hold the eyelet B closed.

The reenforcement is one that may be inexpensively stamped from sheet metal and which may be quickly applied by a suitable tool or tools.

What I claim as my invention is:—

1. In a device of the character described, the combination with an elongated member having a portion thereof return-bent to form an eyelet, of a sheet metal reenforcement for said eyelet.

2. In a device of the character described, the combination with an elongated member forming an eyelet and having a portion beyond said eyelet extending adjacent to the body of said member, of a sheet metal member embracing said end portion, together with the adjacent length of said elongated member and interlocked with said end portion to resist longitudinal shifting thereof within the reenforcement.

3. In a device of the character described, the combination with an elongated member return-bent to form an eyelet and having its return-bent portion extended beyond said eyelet in proximity to the body of the elongated member, of a sheet metal reenforcement embracing said extended portion of the return-bend, together with the adjacent length of the elongated member, said reenforcement and the extended return-bent portion being crimped in an interlocking relation resisting lengthwise shifting of the return-bent portion within the reenforcement.

4. In a device of the character described, the combination with an elongated member return-bent to form an eyelet, of a sheet metal reenforcement for said eyelet formed with an opening registering with that of the eyelet.

5. In a device of the character described, the combination with an elongated member formed with an eyelet, of a sheet metal reenforcement for said eyelet having a hook engaging the end of the eyelet and resisting shifting of the reenforcement from the eyelet upon the elongated member.

6. In a device of the character described, the combination with an elongated member formed with an eyelet, of a sheet metal reenforcement for said eyelet partially embracing the eyelet, and having edges opposing each other at one side of the eyelet, said reenforcement being substantially coextensive with the eyelet at the other side thereof and being apertured in registration with the eyelet opening.

7. In a device of the character described, the combination with an elongated member formed with an eyelet, of a sheet metal reenforcement for said eyelet partially embracing the eyelet, and having approaching longitudinal edge portions at one side of the eyelet, and having a portion at the other side of the eyelet substantially coextensive with the eyelet and apertured in registration with the eyelet opening and having a hook integral therewith embracing the end of the eyelet.

8. In a device of the character described, the combination with an elongated member return-bent to form an eyelet and to extend beyond said eyelet adjacent the body of said elongated member, of a reenforcement embracing the extended portion of the return-bend, together with the adjacent portion of the elongated member and also partially embracing the eyelet.

9. In a device of the class described, the combination with an elongated member having a terminal eye, of means for reenforcing said eye comprising a sleeve surrounding the member having an aperture registering with the eye.

10. In a device of the class described, the combination with an elongated member having a terminal eye, of means for reenforcing said eye comprising a sleeve surrounding the member, said sleeve having means engaging a portion of said member for preventing the said sleeve from moving lengthwise of the member.

11. In a device of the class described, a member having a portion return-bent and forming an eye, and an extension projecting beyond the eye in proximity to the member, and a reenforcing sleeve crimped upon the extension having portions embracing the member and return-bent portion aforesaid, said sleeve also having an aperture in alignment with the eye.

12. In a device of the class described, a member having a portion return-bent forming an eye, and an extension projecting beyond the eye in proximity to the member, and a reenforcing sleeve having portions embracing the member, return bent portion and extension aforesaid and having an aperture registering with the eye.

13. In a device of the class described, a member having a portion return-bent forming an eye, and an extension projecting beyond the eye in proximity to the member, and a reenforcing sleeve embracing the member and extension, said sleeve and extension having interlocking crimped portions.

In testimony whereof I affix my signature.

CHARLES A. GOODSPEED.